United States Patent [19]

Spohrer

[11] Patent Number: 5,600,774
[45] Date of Patent: Feb. 4, 1997

[54] GRAPHICAL INTERFACE FOR INTERACTING CONSTRAINED ACTORS

[75] Inventor: James C. Spohrer, Santa Clara, Calif.

[73] Assignee: Apple Computer, Inc., Cupertino, Calif.

[21] Appl. No.: 377,140

[22] Filed: Jan. 23, 1995

Related U.S. Application Data

[63] Continuation of Ser. No. 992,937, Dec. 16, 1992, Pat. No. 5,450,540.

[51] Int. Cl.[6] .................................................. G06F 19/00
[52] U.S. Cl. .................................................. 395/174
[58] Field of Search .................................. 395/150, 151, 395/152, 153, 154, 155, 159, 133; 364/443, 444

[56] References Cited

U.S. PATENT DOCUMENTS

| | | | |
|---|---|---|---|
| 5,214,711 | 5/1993 | Neely et al. | 382/107 |
| 5,261,041 | 11/1993 | Susman | 395/152 |
| 5,297,057 | 3/1994 | Kramer et al. | 364/512 |
| 5,307,452 | 4/1994 | Hahn et al. | 395/132 |
| 5,384,912 | 1/1995 | Ogrinc et al. | 395/164 |

OTHER PUBLICATIONS

"CAD Helps Doctors Mend Bad Breaks" by Sally Cusack Aug. 13, 1990, Computer World p. 29.
*Inside Generic CADD* by Randall S. Newton ©1991 pp. 282–283 New Riders Publishing, Carmel, IN.
Swivel 3D Professional by Young Harvill 1990 VPL Research Inc. pp. 4-2, 4-3, 4-4, 4-5, 4-6.
Borning, ThingLab (Ph D Thesis), Jul. 1979.
Kerlick, Moving Iconic Objects in Scientific Visualization, Visualization 1990 Conference, 1990, pp. 124–130.

*Primary Examiner*—Heather R. Herndon
*Assistant Examiner*—Anton W. Fetting
*Attorney, Agent, or Firm*—V. Randall Gard; John S. Ferrell; J. Eppa Hite

[57] ABSTRACT

A graphical interface for visually specifying the behavior of combinations of finite-state and continuous-state actors. The state of an actor may be controlled by the states of other actors. The motion of continuous-state actors is constrained by functions represented as, and analogous to, grooves, sockets, pins, glue, springs, and boxes. These functions may be represented graphically on the actor so that the system of constraints is readily ascertainable to the user.

8 Claims, 10 Drawing Sheets

GRAPHICAL INTERFACE FOR INTERACTING CONSTRAINED ACTORS

This application is a continuation of application Ser. No. 07/992,937, now U.S. Pat. No. 5,450,540, filed Dec. 16, 1992.

BACKGROUND OF THE INVENTION

The present invention relates generally to graphical interfaces, and more particularly to a computer/user interface for visually creating an environment of actors, and particularly to a graphical environment for creating an environment of constrained interacting actors.

Standard programming languages, such as assembly language, Fortran, Cobol, Pascal and C, are very different from natural languages such as English, French, etc. Although the developers of the standard programming languages did attempt to make these languages somewhat intuitive by providing some similarities to natural languages, they are not accessible to the layman. These programming languages are termed "procedural" languages since the exact sequence of procedures to be performed by the computer must be specified by the user. Procedural languages generally contain conditional statements, iterative statements, and subprograms.

Visual programming languages, such as Lab View, go a step farther in terms of providing an intuitive interface between the user and the computer by providing the user with the ability to create a system of arbitrary combinations of visual iconographic primitives, the primitives generally corresponding to subprograms and dataflow commands in a text-based procedural language. The library of primitives is generally highly application specific. For instance, Lab View is a system designed for signal processing, and its primitives include signal processing components such as Fast Fourier Transform modules and inverters, and input/output controls such as sliders, gauges and knobs. However, the primitives in Lab View are not of a low enough level to allow the user to construct sliders or gauges of any type other than those provided by the primitives without using an underlying textual programming language.

Hypercard was developed in the mid-1970's by Apple Computer, Inc. (Apple). Using a textual programming language called "Hypertalk," Hypercard allows the user to configure visual components, such as buttons, text and graphics, to create an interface, such as a database. (Hypercard and Hypertalk are registered trademarks of Apple Computer, Inc.) Hypertalk is considered to be one of the first successful natural computer languages. The user may then peruse a configured database setup by pushing buttons to access the text and graphics in the database. In Hypercard over 50% of the underlying Hypertalk code controls the graphical interface.

Object constraint programs, such as Thing Lab by Alan Borning at Xerox PARC (see Xerox technical report #425), allow the user to construct a system of interacting actors subject to constraints such as rotation about a point, translation along a line, distance between a first actor and a second actor being equal to distance between a third actor and a fourth actor, etc. In general, these programs have the disadvantages that (i) the imposed constraints are not readily visible to the user, (ii) the primitives are of such a low level that construction of simulated real-world actors requires many construction steps, and (iii) the state of one actor cannot be coupled to another actor, except by the system of physical constraints provided in the primitives.

Graphical interfaces a user may wish to create include systems such as a simulated flight control panel or the standard Macintosh windowing environment where a window includes pull-down menus, icons, scroll bars, etc. To create such environments using C, Lab View, or even Hypercard, can be a complex and difficult programming task beyond the capabilities of all but the experienced programmer.

The present invention allows the programmer to construct a system consisting of complex interacting actors from a set of useful and intuitive primitive actors (primitives). Components of the system may be finite state actors, such as numerical readouts or toggle switches, or continuous-state actors such as sliders and gauges. The primitives which provide couplings between actors include: sockets for rotation of an actor about a point; grooves for translation of actors along a path; pins to specify the locations at which groove and socket constraints are applied; glue to affix one actor to another; boxes to prevent actors from coming closer than a predetermined length from each other; and groups of springs to align the spacing of actors. For instance, the slider 10 shown in FIG. 1a may be considered to be a square control knob 12 within a rectangular frame 14, the knob 12 being constrained to motion along a groove 18 by pin 16. A calibration scale 19 consists of a series of lines, as shown in FIG. 1a, though it may alternatively be a sequence of numbers. The pin 16 and groove 18 may be visible to the user, as shown in FIG. 1a, or hidden for ease of viewing. On an Apple computer having a mouse or a trackball the knob 12 may be moved by moving the cursor (not shown) to the knob 12, depressing the mouse button, dragging the knob 12 to the desired position, and releasing the mouse button.

Similarly, the gauge 20 shown in FIG. 1b is constructed of a hemicycle viewing window 22, and a needle 24 mounted in socket 26 by pin 28. Because the needle 24 is mounted in the socket 26 it is constrained to rotate about the center of the socket 26. The present invention allows the user to place the needle 24 "behind" the window 22 so that only the portion of the needle 24 inside the window 22 is visible to the user, therefore allowing the gauge 20 to more closely resemble real-world gauges. The needle 24 may be moved by positioning the cursor on the needle 24, and clicking and dragging the needle 24 to a new position.

The present invention also allows for coupling of the state of the slider 10 to the state of the gauge 20. This coupled configuration may, for instance, simulate a throttle and speedometer: as the throttle knob 12 is moved from the left hand side of the groove 18 to the righthand side, the tip of the needle 24 in the gauge 20 moves from the far lefthand edge of the window 22 to the far righthand edge.

In the present invention the constraints incorporated into a system of actors are represented iconographically. For instance, a rotational coupling is represented by a pin and socket icon, a translational coupling along a line is represented by a groove and pin icon, a fixed distance coupling between actors is represented by a box, etc. These iconographic representations allow the user to quickly and easily determine the constraints imposed on the system of actors.

An object of the present invention is therefore to provide an intuitive graphical interface accessible to the layman.

Another object of the present invention is to provide a graphical interface which allows a wide range of environments to be created.

Another object of the present invention is to provide a graphical interface which allows for the construction of kinetic actors whose motions are constrained, and where the motion of an actor or actors may control the motion of another actor or actors.

Another object of the present invention is to provide a graphical interface with motional constraints that are represented in icon form in the system of actors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the claims.

SUMMARY OF THE INVENTION

The present invention is directed to a method for constructing an interacting system of actors on a display screen, including the steps of: choosing a first actor from a predetermined set of actor primitives; choosing a second actor from the same set of actor primitives; choosing a constraint from a predetermined set of constraint primitives, each constraint primitive having an iconographic representation, the set of constraint primitives including translation along a path, rotation about a point, fixing the distance between edges of two actors, and setting the distance between a first pair of actors equal to the distance between a second pair of actors; applying the chosen constraints to the first and second actors, the iconographic representation of the chosen constraint appearing on the display screen; and moving the first actor relative to the second actor according to the chosen constraint.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 4b is a closeup view of the pin in the socket of FIG. 4a.

FIG. 5 is a view of a slider whose position controls the state of the gauge of FIG. 4a.

DESCRIPTION OF THE PREFERRED EMBODIMENT

The present invention will be described in terms of the preferred embodiment. The preferred embodiment is an apparatus and method for a graphical interface which allows the construction of an environment of interacting actors. Because the preferred embodiment of the present invention is implemented on a computer produced by Apple Computer, Inc., i.e. an Apple computer, operation of the invention will be described using components, such as mouse cursor control, icons, and menus, standardly available with Apple computers. However, it is to be understood that the invention can be implemented on other types of computers and using other types of cursor control systems, such as the rollerball cursor control system.

Standard mouse operations include moving the mouse, clicking, clicking and dragging, and double clicking. The position of the screen cursor is controlled by motion of the mouse. Roughly, the direction and distance the mouse is moved is mapped to the cursor displacement. The click operation involves a depression and subsequent release of a button located on the mouse, and double clicking consists of two clicking operations performed in rapid succession. The clicking and dragging operation consists of positioning the cursor at a first desired location, depressing the mouse button, moving the cursor (and therefore the mouse) to a second desired location, and releasing the mouse button.

Windows, menus, and icons are other standard Apple software features. A screen may display multiple windows, with each window running a different process. For instance, one window may display the code of a program, a second window may show graphical output from that program, and a third window may display electronic mail correspondence. The user may operate in any window by moving the cursor to a position within that window and clicking.

Icons are graphical representations of files, folders, memory units, or applications. By clicking on an icon the unit represented by the icon is accessed. Similarly, menus contain applications or options which the user may select. Menus are generally represented by text along the top edge of a window. The items in the menu are displayed by depressing the mouse button with the cursor located on the text. By dragging the cursor down the menu items, and releasing the mouse button with the cursor located on the selected item, that item is accessed. The implementation of computer programs incorporating windows, icons, menus, and a mouse is well-known in the art, and the details of such implementations can be found in texts such as Macintosh Revealed, by Stephen Chernicoff, published by Hayden Book Company, Berkeley, Calif. (1985), which is incorporated herein by reference.

Figure 2A:
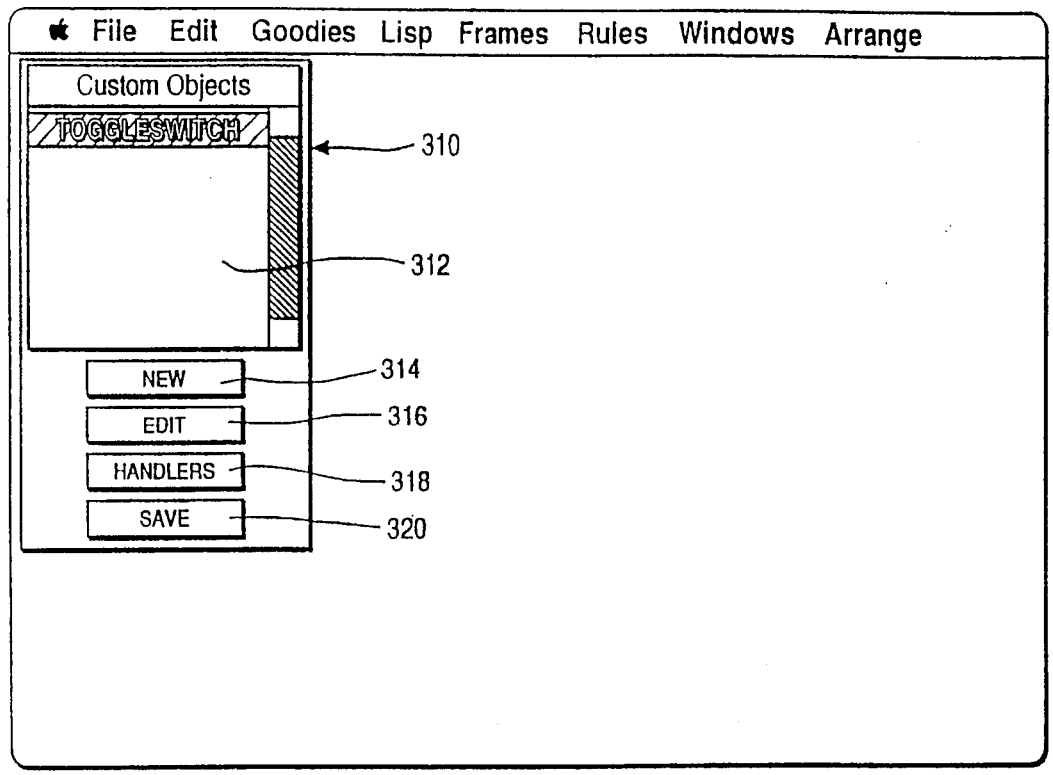
FIG. 2a shows a window with an actor palette.
Figure 2B:
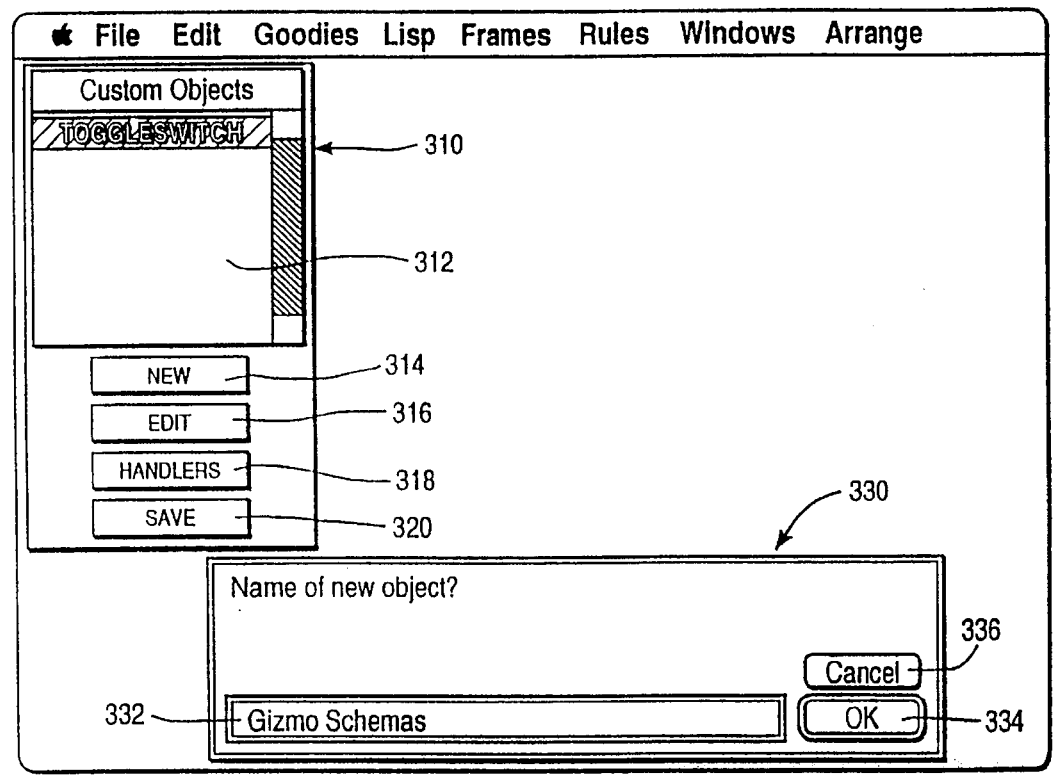
FIG. 2b shows the window of FIG. 2a further including a naming window.

Referring now to FIG. 2a, actors are created by a series of commands which begins with an actor palette window 310. The sequence of words (File, Edit, Goodies, Lisp, Frames, Rules, Windows, and Arrange) across the top of the screen 40 are the names of pull-down menus. Some menu options of particular relevance to the present invention will be discussed in more detail below. The actor palette window 310 contains a list 312 of actors which have already been created, in this case the single item "Toggleswitch," a NEW button 314, an EDIT button 316, a HANDLERS button 318, and a SAVE button 320. To create a new actor, first the actor is named by depression of the NEW button 314, i.e. by moving the cursor to the NEW button 314 and clicking. Upon depression of the NEW button 314, a naming window 330 appears, as shown in FIG. 2b. The user must position the cursor in the text window 332 and enter the desired name of the actor at the keyboard. In this case the name of the actor is "Gizmo Schemas." Once the OK button 334 is depressed the naming window 330 disappears, and the name "Gizmo Schemas" will appear in the list field 312. If the user decides that he or she does not wish to name a new actor then the CANCEL button 336, rather than the OK button 334, may be depressed. The HANDLERS button 318 is used to attach code called a 'handle' to an actor, for instance, highlighting the actor where the mouse is located by turning it blue. A handle is created by specifying with the mouse the actors to be affected by the handle, depressing the HANDLERS button 318 at which point a code window (not shown) will appear, entering the code necessary to perform the desired handle operations, and closing the code window.

Figure 2C:
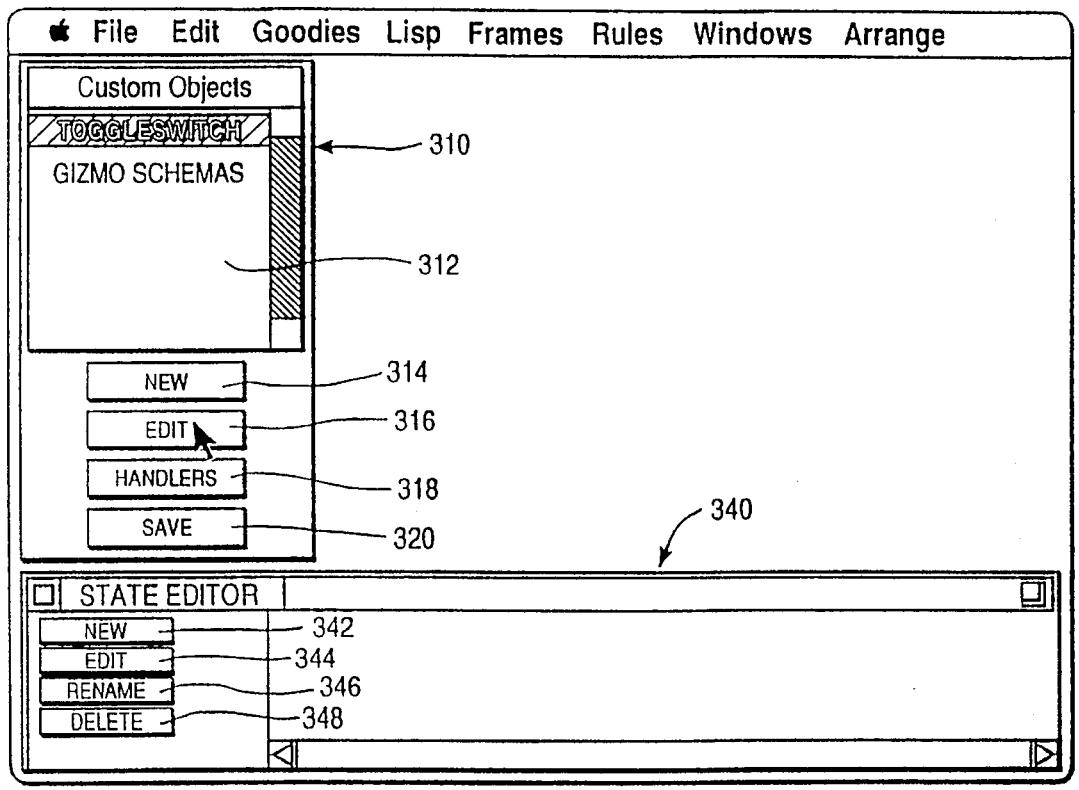
FIG. 2c shows the window of FIG. 2a, further including a state editor window.

To create the actor named Gizmo Schemas the user double clicks on the name Gizmo Schemas in the actors list 312 (or single clicks on the name Gizmo Schemas, and then clicks the EDIT button 344), at which point a state editor window 340 will appear, as shown in FIG. 2c. The state is named by pressing the NEW button 342, followed by a series of operations analogous to those described above for naming the actor. If the user wishes to rename the state, the RENAME button 346 is depressed, and again a series of operations, analogous to those described above for naming, are performed. If the user wishes to delete a state the DELETE button 348 is depressed.

Figure 3:
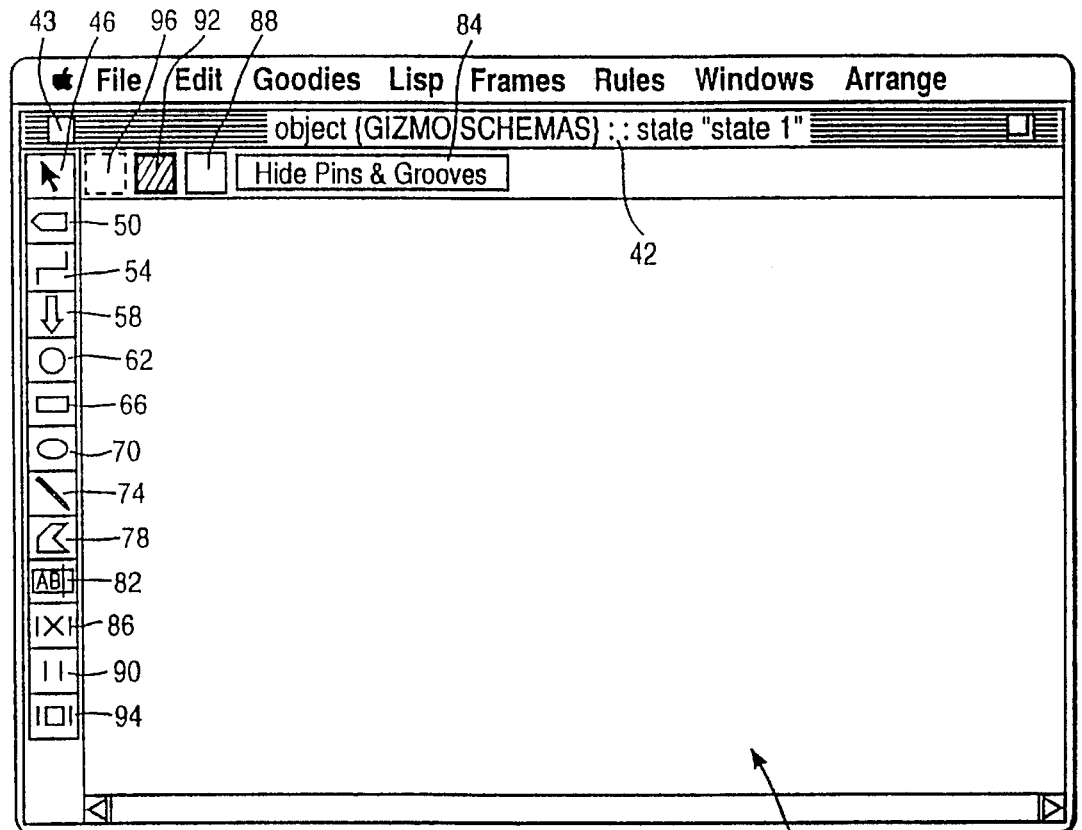
FIG. 3 is a view of a draw window according to the present invention. The icons along the lefthand edge of the screen represent the primitives provided by the present invention.

Once the state has been named the actor is created by depressing the EDIT button 344 in the state editor window 340. When the EDIT button 344 is depressed a draw window 40 appears on the screen. Shown in FIG. 3 is the draw window 40 of the preferred embodiment with the primitives of the present invention displayed in icon form on the lefthand side of the window 40. The text field 42 at the top of the window 40 indicates that the actor to be constructed is named "Gizmo Schemas" and the state of the actor is named "state 1."

Below the cursor arrow 46 in the upper left-hand corner of the window 40 are the icons for tags 50, grooves 54, pins 58, sockets 62, rectangular shapes 66, elliptical shapes 70, line segments 74, irregular polygon shapes 78, text display 82, springs 86, glue 90, and boxes 94. Across the top edge of the window 40 from left to right are icons for frame color adjustment 96, interior color adjustment 92, frame thickness 88, and a button for hiding pins and grooves 84. Upon depression of the pin and groove hiding button 84, the text inside the button toggles to the text "Show Pins & Grooves."

The tag icon 50 is used to attach a textual name to an actor so that the actor may be referred to by code in an underlying textual programming language. To attach a tag to an actor or group of actors, the actor or actors are specified by the mouse (by clicking on the actor, or by clicking and dragging a specification rectangle over the group of actors), depressing the tag icon 50 at which point a text window will appear, entering a tag name for the specified actor or actors in the text window, and closing the text window.

The rectangular shape 66, the elliptical shape 70, and the irregular polygon shape 78 are icons which allow the user to create, size, and position an actor having a rectangular, elliptical, or polygonal shape, respectively, but having no inherent kinematic properties. For instance, a rectangle is created using the rectangular shape icon 66 by clicking on the icon 66, moving the cursor to a screen location where a first corner of the rectangle is to be located, depressing the mouse button, dragging the cursor to a second screen location where the transverse corner is to be located, and releasing the mouse button, thereby creating a rectangle of the desired size in the desired location. The location of the shape can be modified by clicking on the cursor arrow icon 46, and then clicking and dragging on the rectangle. Generating an elliptical shape involves essentially the same sequence of steps as those listed above for generating a rectangular shape; however, in this case the positions where the cursor is clicked determine the locations of transverse corners of a rectangle which circumscribes the generated ellipse.

A polygon of arbitrary shape is created using the irregular polygon shape icon 78 by clicking on the icon 78, moving the cursor to a screen location where a first corner of the polygon is to be located, clicking, moving the cursor to a second screen location where a second corner is to be located, clicking, etc., until, finally, at the last corner of the polygon the mouse is double-clicked. The final double click closes the shape, thereby creating a polygon of the desired size in the desired location. The location of the shape can be modified by clicking on the cursor arrow icon 46, and then clicking near the center of the shape and dragging on the polygon. The positions of a corner of the shape may be adjusted by clicking on the cursor arrow icon, and then clicking and dragging near the selected corner.

A line segment is drawn using the line segments icon 74. A line segment is generated by clicking on the icon 74, moving the cursor to a first position on the screen 40, depressing the mouse button, dragging the cursor to a second position on the screen 40, and releasing the mouse button. The line segment generated using this function connects the aforementioned first and second positions.

Text is displayed on the screen by clicking on the text icon 82, positioning the cursor at a beginning location for the text, and typing the desired text at the keyboard. The font of the displayed text may be controlled by a submenu command entitled "Fonts" located in the Goodies menu. The text may be moved by clicking on the cursor arrow icon 46, and then clicking and dragging on the text.

The text display function and the rectangular, elliptical and irregular polygonal shape functions described above are similar to functions found in commercialized products, such as MacDraw™ and MacPaint™ published by Apple Computer, Inc., and their implementation and use are therefore well-known in the art.

When an actor is selected (by positioning the cursor on the actor and clicking), the frame color of the actor, the interior color of the actor, and the frame thickness of the actor may be altered by clicking on the three icons 96, 92 and 88 to the direct right of the cursor icon 46, respectively. When one of the icons 96, 92 or 88 is clicked, a color wheel (not shown) appears on the screen. On the color wheel the intensity of color varies radially, and the hue varies azimuthally. A color is selected by positioning the cursor over the selected color and clicking. Through careful selection of colors a visually agreeable graphical interface may be generated.

The groove 54, socket 62, pin 58, springs 86, glue 90, and boxes 94 icons provide the user with means for constraining the motion of actors generated using the shape and text generating functions described above. For instance, in FIG. 4a the needle 104 (generated using the irregular polygon generator) is constrained to rotate about the center point of circular actor 110 (generated using the elliptical shape generator) by using a socket 106 and a pin 114 to provide a gauge 105. The socket 106 is placed at the center of the circle 110 by clicking on the socket icon 62 and then clicking in the center of the circle 110. As shown in FIG. 4b, extending from the center of the socket 106 are a small pointer 108a and a large pointer 108b (referred to collectively by the single reference numeral 108 in FIG. 4a). By default the pointers 108 point at 12 o'clock. The range of motion of the socket 106 may be restricted from the default of 360° by clicking on the small pointer 108a, and then clicking and dragging the small pointer 108a to a first orientation, and clicking on the large pointer 108b and then clicking and dragging the large pointer 108b to a second orientation, as shown in FIG. 4b. The range of motion of the socket 106 is then the clockwise range from the small pointer 108a to the large pointer 108b. The needle 104 is positioned as shown, and then the pin 114 is placed through the needle and into the socket 106 by clicking on the pin icon 58 and clicking on a point inside the socket 106. When the pin 114 is placed into the socket 106, input and output ports 116 and 118 appear on the lefthand and righthand edges of the circle 110, respectively. In general, each socket is assigned an input port on the lefthand side and an output port of the righthand side of the actor containing the socket.

Once the construction of a state is completed, the state is saved by clicking on the close box 43 in the upper left corner of the draw window 40. If a multistate actor, such as a toggleswitch or an on/off light is to be created, then a second state of the actor must be created also. Additional states are created by a series of operations analogous to the creation of the first state. Each state of an actor must be given a unique name. When the actor with all its states is created the SAVE button 320 on the actor palette 310 is depressed. Actors listed in the list field 312 of the actor palette 310 may be placed in a project window (not shown) to create complicated systems such as an airplane flight control panel. The motional constraints developed in the draw window 40 also apply in the project window, and in addition, actors in a project window may be toggled between states. However, actors may not be constructed in the project window.

Figure 4A:
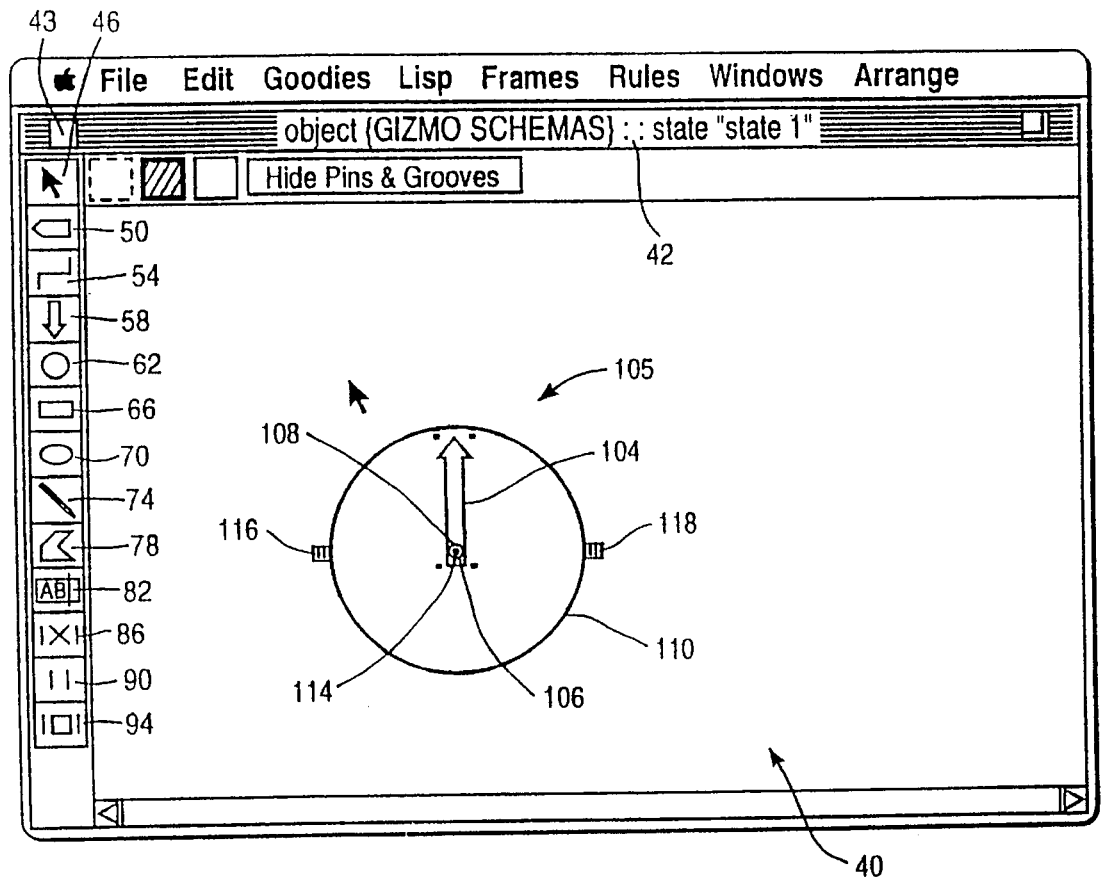
FIG. 4a is a view of the draw window of FIG. 3 with a needle pinned in a socket in the middle of a circle.
Figure 4B:
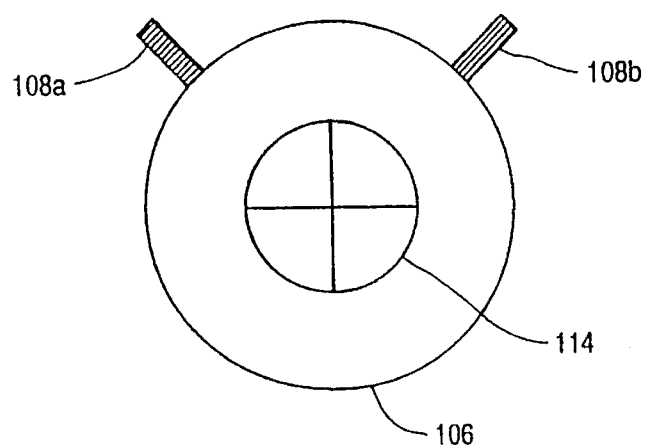

The position of the needle 104 of FIG. 4a may be controlled by either feeding an input value into the input port 116, or by clicking and dragging on the needle 104. In either case each point (x,y) on the needle 104 is constrained by the equation $$R^2=(x-x_0)^2+(y-y_0)^2$$

where $(x_0,y_0)$ are the coordinates of the center of the socket 106, and R is a constant equal to the distance of point (x,y) from the center of the socket 106. If during the click and drag operation the cursor does not follow a circular arc centered around the socket 106 (and in general it will not), it is necessary to extract the initial and final polar coordinates $(r_i,\phi_i)$ and $(r_f,\phi_f)$ of the cursor with the origin defined to be the center of the socket 106. The needle 104 is then rotated by an angle of $(\phi_f-\phi_i)$.

Figure 1A:
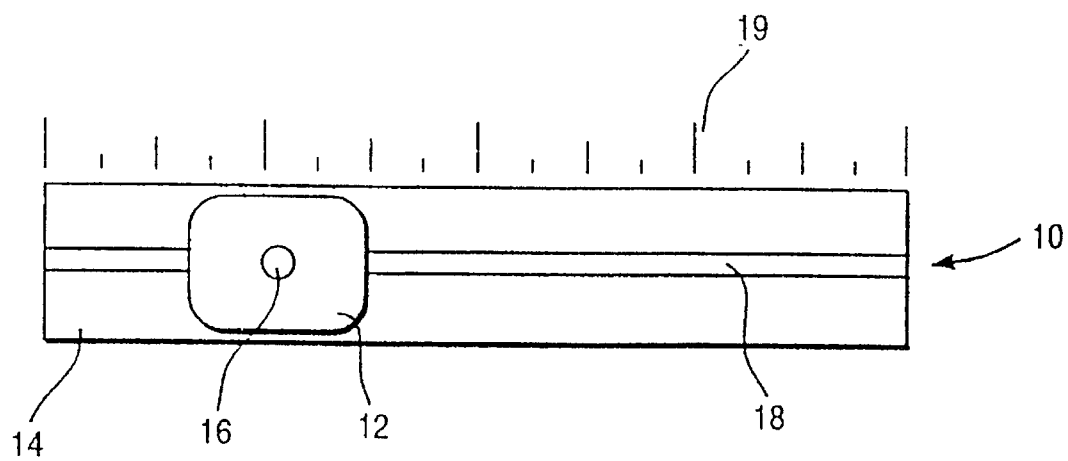
FIG. 1a shows the components of a slider.
Figure 1B:
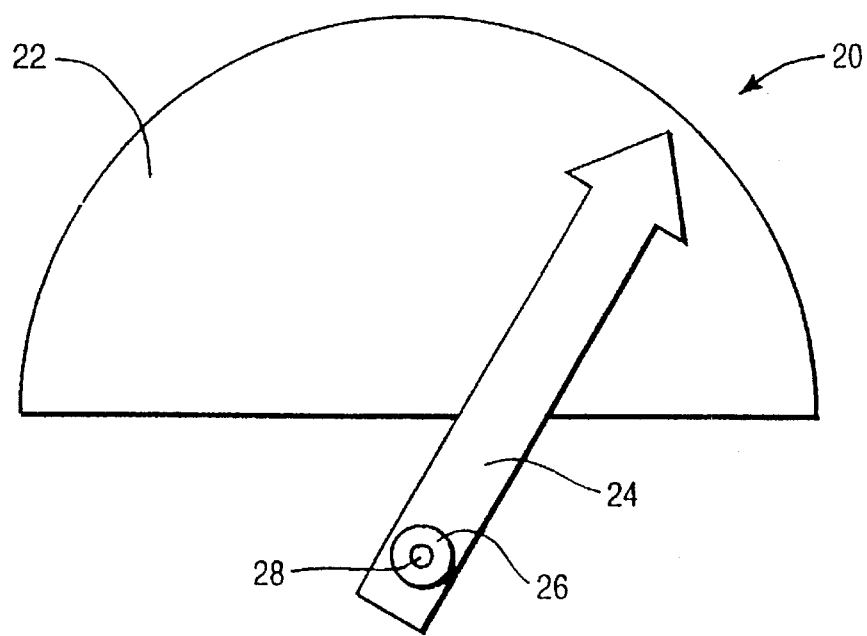
FIG. 1b shows the components of a gauge.

Actors may be layered so that it appears that some actors are closer to the user than other actors. For instance, in the gauge of FIG. 1b, the needle 24 was drawn subsequent to the gauge window 22 and so it appears that the needle 24 is closer to the user than the gauge window 22. To place the needle 24 behind the gauge window 22 the user depresses the control key (not shown) on the keyboard, and clicks on the needle 24. By default the socket 26 and pin 28 will also be placed behind the window 22 by this command since they are connected to the needle 24 rather than the window 22.

Figure 5:
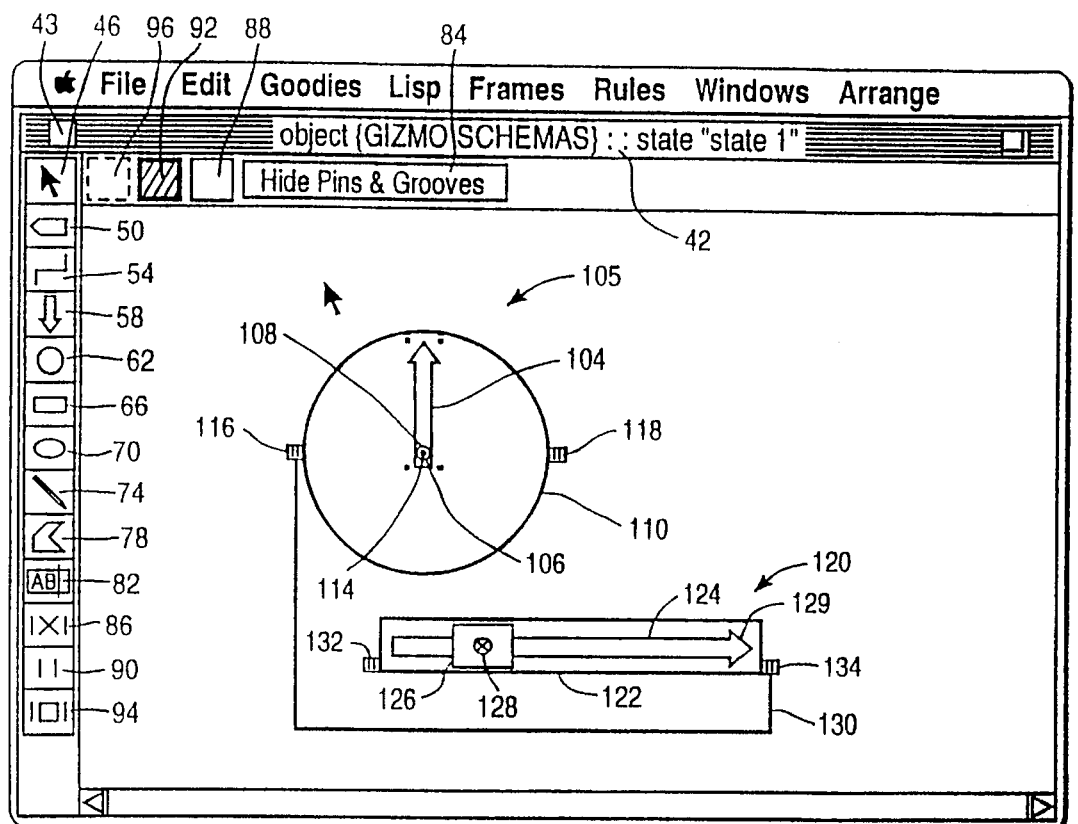

In FIG. 5 a slider 120 has been connected to the gauge 105 discussed above. The slider 120 is constructed from an elongated rectangle 122, a groove 124, a square slider knob 126, and a pin 128 placed through the knob 126 along the groove 124. The pin 128, rectangle 122 and knob 126 are generated using the techniques described above. The groove 124 is generated by clicking on the groove icon 54, positioning the cursor at the lefthand end of the groove 124, clicking, moving the cursor to the righthand end of the groove 124, and double clicking. A nonlinear groove is generated by a series of repositionings and clickings terminated with a final double click. When the pin 128 is placed through the knob 126, and into the groove 124, input and output ports 132 and 134 appear on the lefthand and righthand sides of the rectangle 122, respectively. The direction of the groove 124 is notated by an arrowhead 129 at the righthand end of the groove 124. The side of the groove 124 with the arrowhead 129 is assigned a value of one, and the side of the groove 124 without the arrowhead 129 is assigned a value of zero.

The path of a linear groove is defined by $$x=x_0+\alpha_1 v_1,$$

where bold variables represent vectors, x is the position, $x_0$ is the location of the end of the groove without the arrowhead, $v_1$ is the vector from the end of the groove without the arrowhead to the end with the arrowhead, and $0<\alpha_1<1$. Similarly, for a groove consisting of two linear segments, the path is defined by $$x=x_0+\alpha_1 v_1,$$

on the segment adjacent the end without the arrowhead, and $$x=x_0+v_1+\alpha_2 v_2,$$

on the segment adjacent the end with the arrowhead, where $v_2$ is the negative of the vector from the end of the groove with the arrowhead to the point between the two linear segments and $0<\alpha_2<1$. Grooves consisting of three or more linear segments have a path defined by a straightforward generalization of these equations. A translation of an actor pinned to a groove is also determined by these equations. Since in general the cursor will not exactly follow the path of a groove, to determine the effective location of the cursor along the groove, for each linear segment of the groove the position of the cursor is decomposed into the distance along the segment and perpendicular to the segment. The groove position of the cursor is assigned to the segment to which the cursor is closest, and the position of the cursor along that groove segment is equal to the point of projection of the cursor onto that segment. In cases where the cursor is equidistant from more than one groove segment the actor is moved so as to make the motion as continuous as possible.

By clicking on the cursor arrow icon 46, and then depressing the mouse button with the cursor positioned over the output port 134 of the slider 120, moving the cursor to the input port 116 of the gauge 105, and releasing the mouse button, a wire 130 appears on the screen 40 connecting the two ports 116 and 134. Upon connection of the ports 116 and 134 the needle of the gauge 105 repositions to correspond to the position of the knob 126 of the slider 120. With the output port 134 of the slider 120 connected to the input port 116 of the gauge 105 the needle 104 can be manipulated either by moving the knob 126 of the slider 120 or by moving the needle 104 directly by clicking and dragging. If the output port 118 of the gauge 105 is connected to the input port 132 of the slider 120 (in addition to the connection of the output port 134 of the slider 120 being connected to the input port 116 of the gauge 105), manipulation of the needle 104 controls the position of the knob 126, and manipulation of the knob 126 controls the position of the needle 104.

Figure 6:
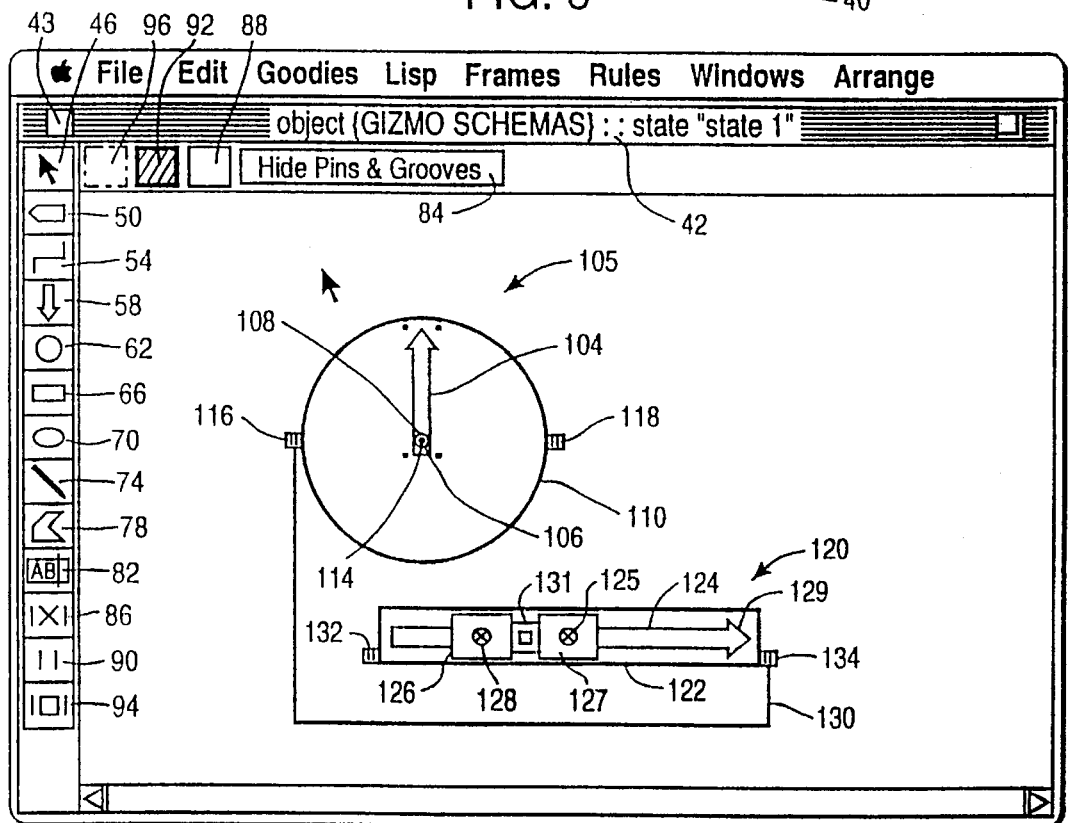
FIG. 6 is the slider/gauge system of FIG. 5 further including an additional slider knob connected to the original slider knob by a box.

The box icon 94 is used to fix the spacing between actors. For instance, as shown in FIG. 6, a second knob 127 may be attached to the first knob 126 by a box 131 by clicking on the box icon 94, and then clicking and dragging from the right edge of knob 126 to the left edge of knob 127. Even when the box 131, groove 124, and pins 125 and 128 are hidden from view by depression of the Hide Pins & Grooves button 84, motion of either knob 126 or 127 along the slider 120 will induce the other knob to move also. Actors may also be glued together using the glue icon 90. Attachment of actors by gluing is actually equivalent to attachment with a box of zero width. To glue two actors together they must be positioned with a predetermined minimum distance from each other prior to gluing.

A group of actors may be aligned by attaching the actors together by springs. Springs may be attached between a pair of actors by clicking on the spring icon 86, and then clicking and dragging from one actor to the other. All springs created between the depression of the spring icon 86 and a second depression of the spring icon 86, or the depression of any other icon are considered to be in the same "group." All springs in a group are constrained to have equal length, and springs have a minimum length of zero. By clicking and dragging to the right on the right edge of the rightmost actor in a group of actors connected together by springs in a horizontal line, the spacing between actors expands and the leftmost actor remains in its original position. Mathematically, the displacement $\delta x_i$ of the $i^{th}$ actor from the left in the group of N actors described above is given by:

$$\delta x_i = (i/N) \delta x_N.$$

Similarly, contracting the spacing is accomplished by positioning the cursor arrow of the rightmost edge of the group, depressing the mouse button, and dragging to the left. The spacing can be altered while maintaining the position of the rightmost actor by clicking on the lefthand edge of the leftmost actor. By clicking and dragging near the center of the group, the group as a whole may be positioned.

Figure 7A:
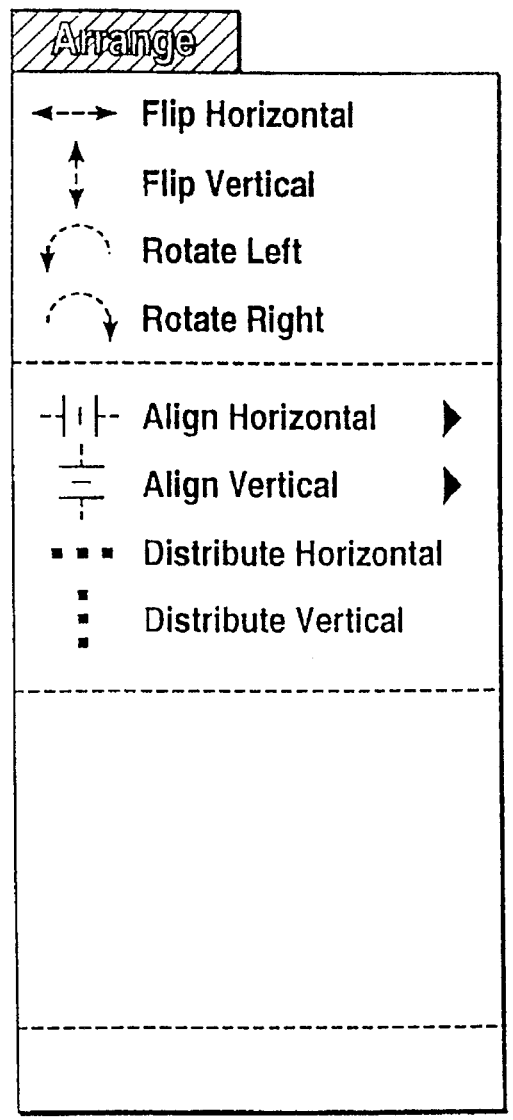
FIG. 7a shows the contents of the Arrange menu.
Figure 7B:
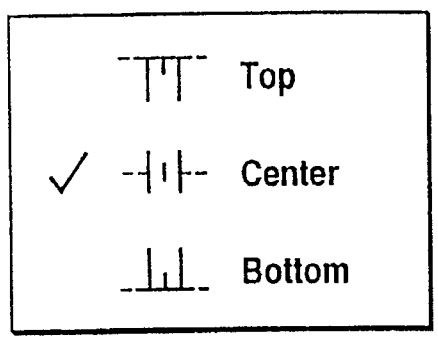
FIGS. 7b and 7c show the submenus accessed by the Align Horizontal and Align Vertical commands, respectively.
Figure 7C:
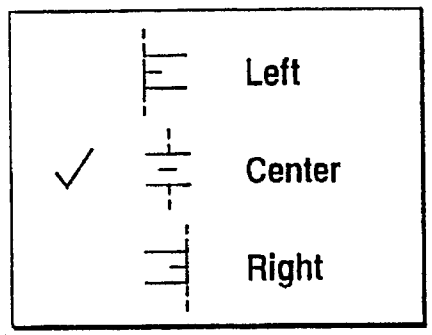

The spacing of groups of actors may also be controlled by any one of several align commands contained in the Arrange menu. As shown in FIG. 7a, the Arrange menu options include Align Horizontal, Align Vertical, Distribute Horizontal, and Distribute Vertical. The Distribute Horizontal and Distribute Vertical commands effectively insert springs between a set of actors. As indicated by the arrowheads to the right of the Align Horizontal and Align Vertical commands, these commands have the submenus shown in FIGS. 7b and 7c, respectively. As suggested by the diagram adjacent the Top command in FIG. 7b, this command applies a Distribute Horizontal command to a set of actors, the top edges of which are pinned in a horizontal groove. Similarly, the Center and Bottom commands in this menu apply the Distribute Horizontal command to a set of actors which are pinned to a groove passing along the middle and along the bottom edges of the actors, respectively. The actors to which these commands apply are selected by positioning the cursor, depressing the mouse button and dragging the mouse. As the mouse is dragged a dashed rectangle forms, the transverse diagonal of the rectangle being defined by the initial clicked position of the cursor and the present position of the cursor. When the rectangle encompasses all actors to be arranged, the mouse button is released.

Figure 8A:
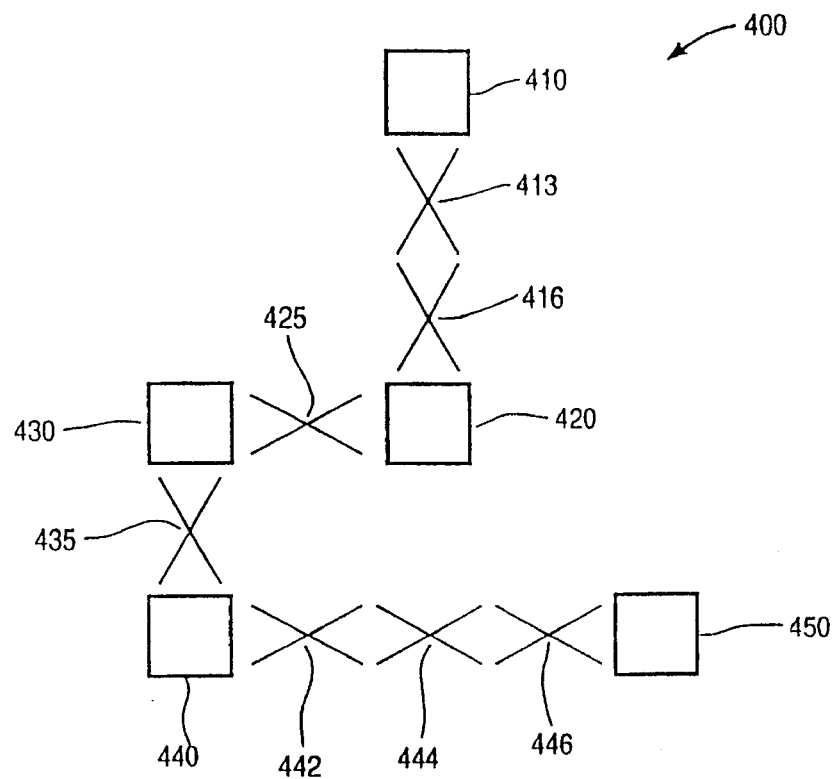
FIG. 8a shows a group of squares connected by springs.

Springs, glue and boxes may also work together on noncolinear actors. For instance, as shown in FIG. 8a, the group 400 of five noncolinear squares 410, 420, 430, 440 and 450 are connected by springs 413, 416, 425, 435, 442, 444, and 446. Assuming all these springs 413, 416, 425, 435, 442, 444, and 446 are in the same group, this configuration expands and shrinks as any pair of squares within the group 400 are displaced from each other. The distance between squares 440 and 430 is always equal to the distance between squares 430 and 420; the distance between squares 420 and 410 is always twice as great as the distance between squares 430 and 420; and the distance between squares 450 and 440 is always thrice the distance between squares 440 and 430. The group 400 may be expanded or contracted by clicking and dragging on the edges of actors in the group 400 which are opposite a connected spring, e.g. by clicking and dragging on the top edge of square 410, the right or bottom edges of square 420, the left or top edges of square 430, the left or bottom edges of square 440, or the right edge of square 450.

Figure 8B:
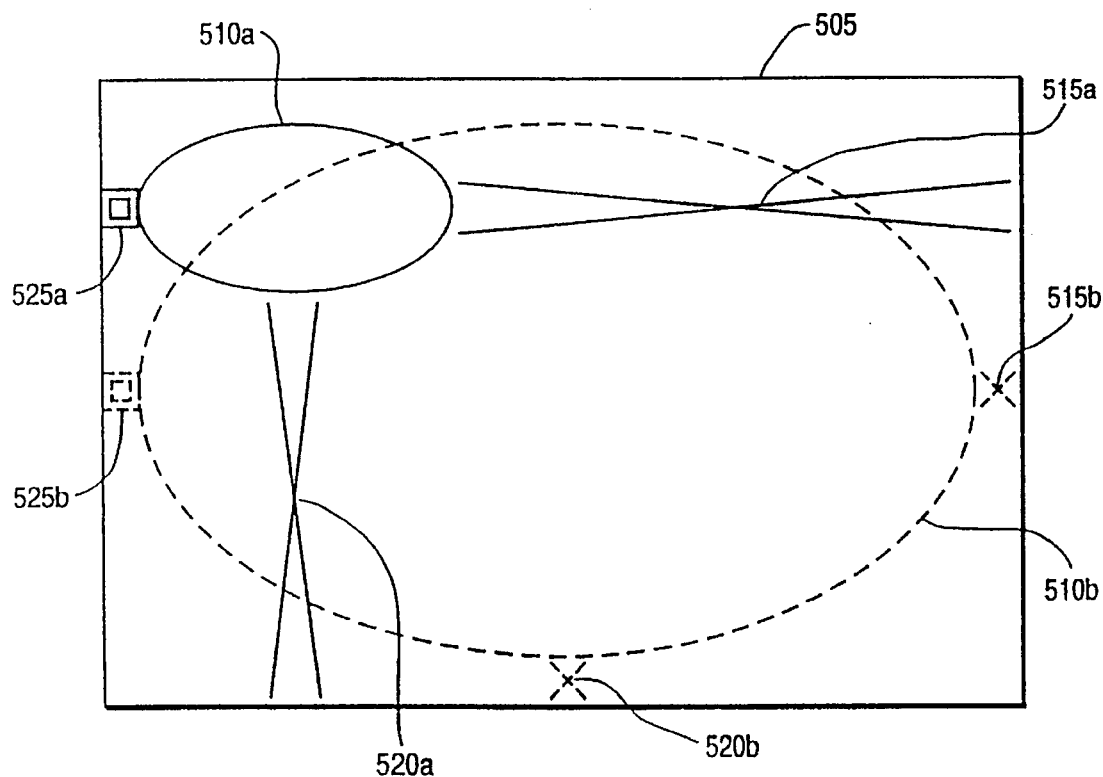
FIG. 8b shows an ellipse connected to a rectangle by a box and two springs.

FIG. 8b shows a pair of springs 515a and 520a and a box 525a connecting an ellipse 510a to a rectangle 505. The ellipse 510a may be resized subject to the constraints that the left edge of the ellipse 510a is a constant distance from the left edge of the rectangle 505, and the distance of the right edge of the ellipse 510a from the right edge of the rectangle 505 is equal to the distance of the bottom of the ellipse 510a from the bottom of the rectangle 505. One possible resizing of the ellipse 510a is shown in FIG. 8b as the dashed ellipse 510b, which is connected by dashed springs 515b and 520b and the dotted box 525b to the rectangle 505.

Figure 9:
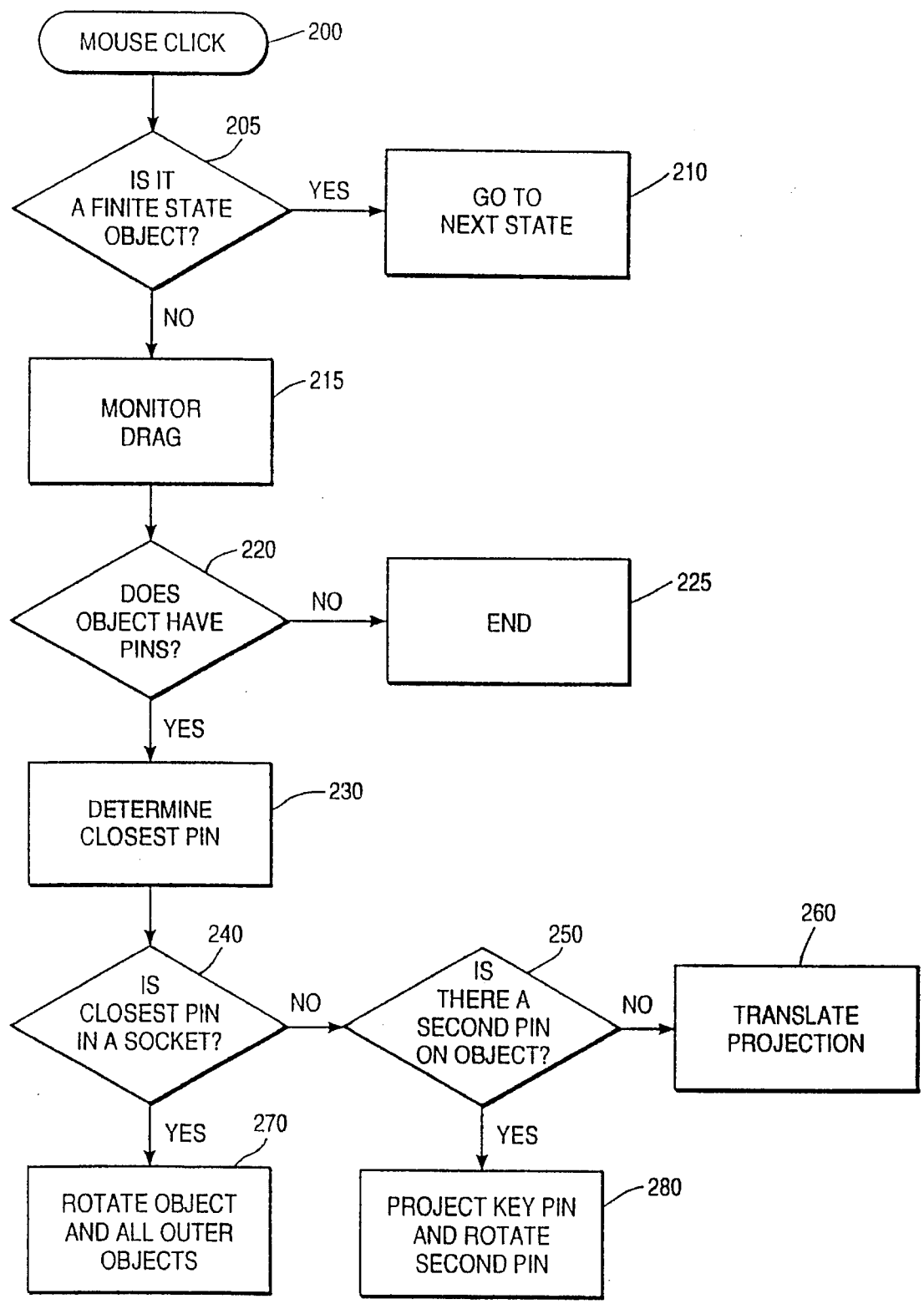
FIG. 9 is a decision tree for interpretation of a mouse-driven motion command for actors coupled to a screen area by constraints which include pins, sockets, and grooves.

The decision tree for mouse-driven motion of actors is presented in FIG. 9 for an actor constrained by pins, grooves and sockets. When a mouse click is entered 200 the system first determines the position of the cursor, and whether it lies on a finite-state actor 205. If the cursor lies on a finite-state actor, then the actor proceeds to the next state 210. If the cursor does not lie on a finite-state actor the system monitors the path of the drag of the mouse 215. Then it is determined whether the actor on which the cursor lies has any pins 220 passing through it. If the actor does not have any pins the decision tree ends 225. If the actor does have at least one pin, then the system determines if the pin closest to the cursor is in a socket 240. If the pin is in a socket the actor is rotated according to the rotation equations discussed above. Furthermore, all actors which are pinned onto the rotated actor (as opposed to all actors which the rotated actor is pinned onto) are also rotated according to the same rotation equation 270. If the closest pin to the cursor is not in a socket then it is determined whether there is a second pin through the actor 250. If there is only a single pin through the actor then the actor is translated according to the translation equations discussed above 260. However, if there are two pins through the actor then the actor must be translated and rotated so that both pins stay in the groove. This is accomplished by translating the key pin (the pin closest to the cursor) along the groove according to the translation equations discussed above, and rotating the actor according to the rotation equations discussed above such that the second pin also remains in the groove 280.

Figure 10:
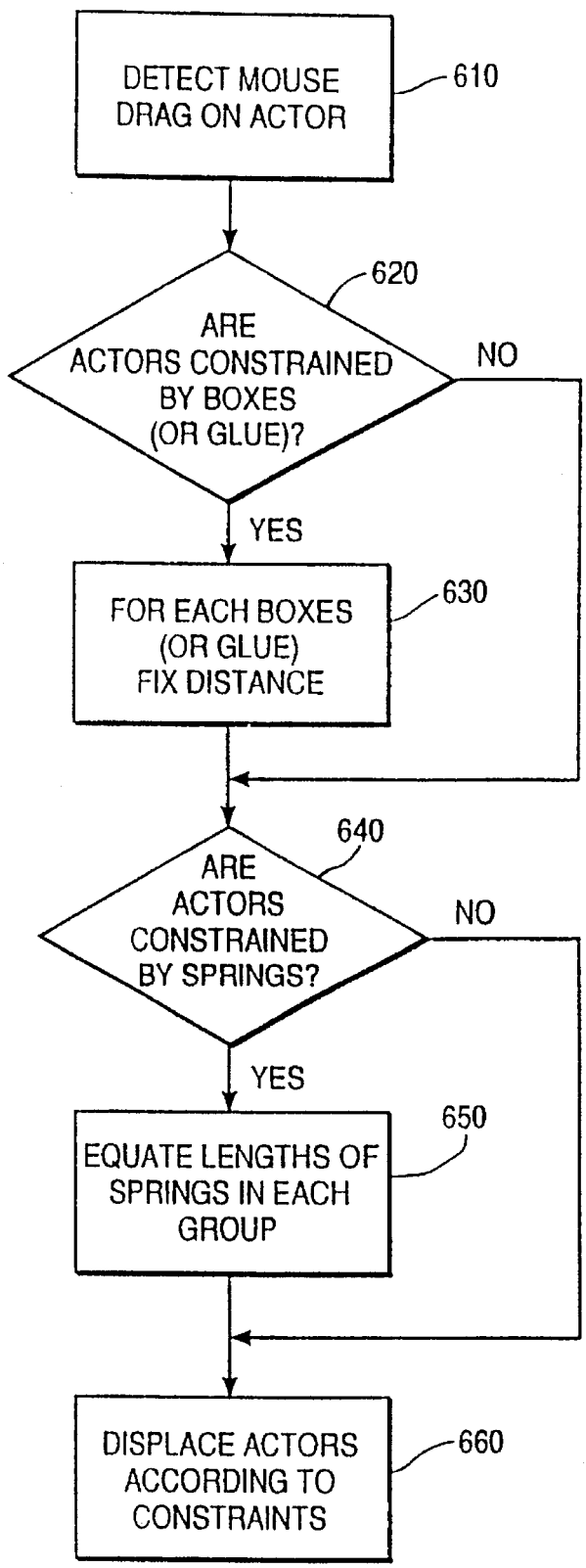
FIG. 10 is a decision tree for interpretation of a mouse-driven motion command for actors coupled to other actors by constraints which include boxes, springs, and glue.

The decision tree for a mouse-driven motion command on a group of actors constrained by boxes, glue, and/or springs is shown in FIG. 10. When a mouse drag is detected 610, the system determines whether the group of actors on which the mouse was clicked has any boxes or glue 620. If the group is constrained by boxes or glue the distance between each pair of actors affixed by boxes or glue is fixed 630. (As mentioned above, glue is a special case of a box where the distance between actors is constrained to be zero.) If there are no boxes or glue constraints in the group, the previous step 630 is skipped. Then the system determines if there are any springs constraining the group of actors 640, and if so the distance between the ends of springs in each group are equated 650. Finally, the actors are displaced 660 according to the constraints determined in the preceding steps of the decision tree of FIG. 10.

When a mouse-driven motion command is received by the system, the system must determine if more than one motion option satisfies the applied constraints, decide which type of motion is to be implemented, and determine the course of the motion subject to the applied constraints (see "CONDOR: Constraint-Based Dataflow," by Michael Kass, Computer Graphics, 26, 2, July 1992, from SIGGRAPH '92, Chicago, Ill., Jul. 26–31, 1992 for a discussion of constraint solution using a method analogous to that discussed below). The displacement is calculated analytically according to the equations given above for constraints due to springs, boxes and glue. The system finds all possible solutions which satisfy the constraints, and then picks the "easiest" solution and implements it. When more than one solution is possible the ease of a solution is determined according to the following criteria in rank order:

(1) It is easier to move a property (i.e. an edge of an actor, or the center of an actor) that is pinned into a groove or connected to a spring than it is to move an unconstrained property;

(2) It is easier to move an unconstrained property than one that is pinned into a socket or connected to a box or glue;

(3) It is easier to change one property than it is to change more than one property; and (4) It is easier to move a property that is near the mouse location than one that is far from the mouse location.

Figure 11:
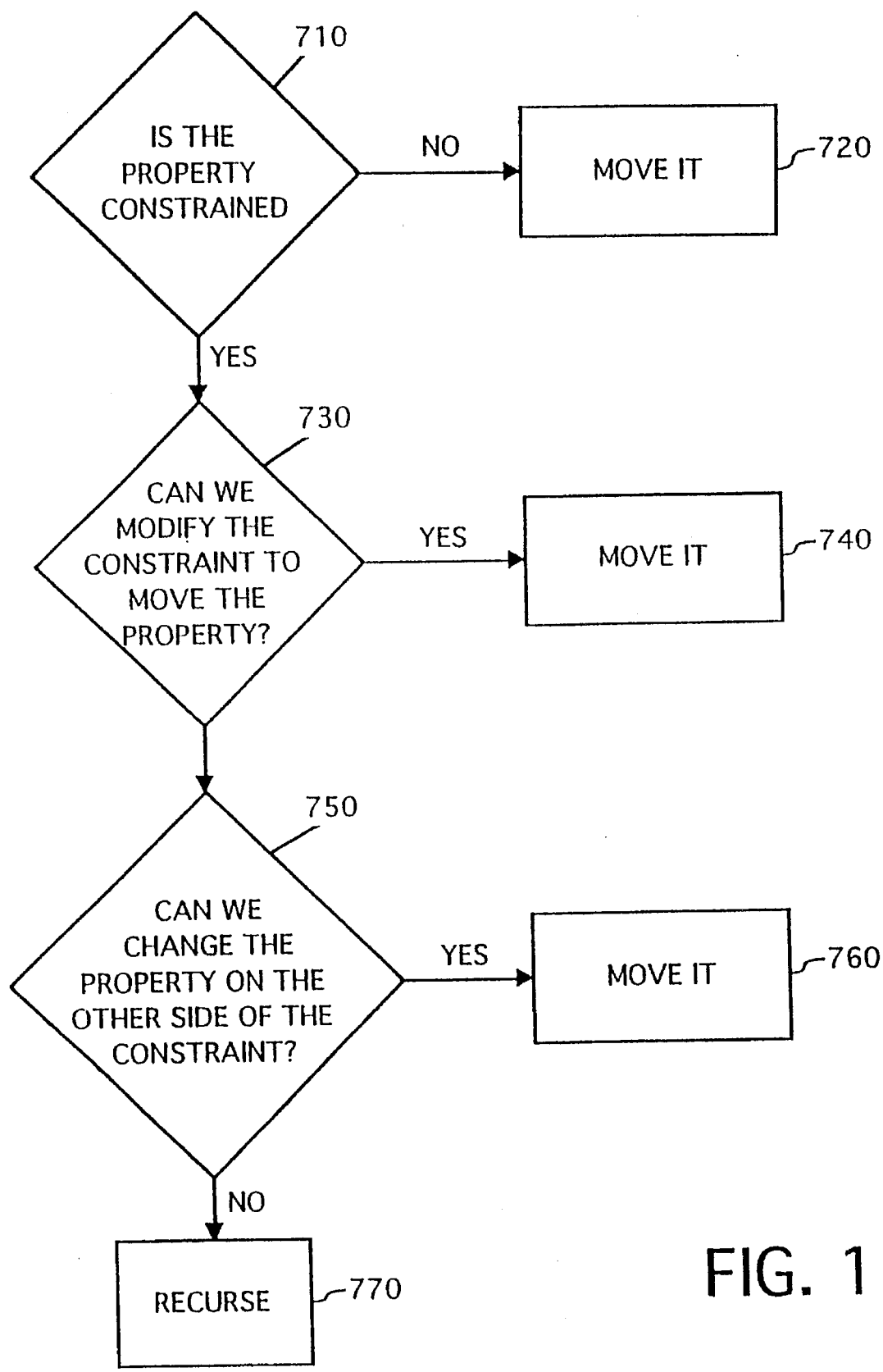
FIG. 11 is a decision tree for interpretation of a mouse-driven motion command for constraints which include pins, sockets, grooves and glue.

The decision tree of FIG. 11 represents the sequence of decisions which the system passes through in determining how to respond to a mouse-driven motion command when more than one motion option is possible. First the system determines if the property (i.e. actor) is constrained 710. If the property is unconstrained it is moved 720. Otherwise, if the property is constrained it is determined whether the constraint can be modified to move the property 730. If the constraint can be modified the property is moved 740. Otherwise, the system investigates whether a property on the other side of the constraint can be moved 750. If so, that property is moved 760, otherwise the decision tree recurses 770.

In summary, an apparatus and method for a graphical interface for visually specifying the construction of interacting actors has been described. Actors created in this environment may be used to simulate real-world systems, such as aircraft control panels having lights, gauges, and other types of indicators, or even to construct actors with no real-world counterparts.

The present invention has been described in terms of a preferred embodiment. The invention, however, is not limited to the embodiment depicted and described. For instance, the icons representing the described functions may have other graphic representations; the package may be able to generate branched grooves; the motion of actors may be affected by effects analogous to gravity, electromagnetic fields, or friction; the windows and buttons may have a different appearance; other constraints may be available; boxes, springs, rectangles and ellipses need not have major axes aligned vertically or horizontally, but instead may be rotatable to any orientation; etc. Rather, the scope of the invention is defined by the appended claims.

What is claimed is:

1. A method for controlling a motion of actors on a display screen in response to a user input when more than one motion is possible, comprising the steps of:

selecting an actor to be moved;

determining if the selected actor can be moved;

if it is determined that the selected actor can be moved, then moving the selected actor; and if it is determined that the selected actor cannot be moved, then returning to the selecting step;

wherein the step of selecting an actor to be moved is one of a group of steps consisting of:

selecting an actor that is pinned into a groove over an unconstrained actor;

selecting an actor that is connected to a spring over an unconstrained actor;

selecting an unconstrained actor over an actor that is pinned into a socket;

selecting an unconstrained actor over an actor that is connected to a box;

selecting an unconstrained actor over an actor that is connected to glue;

selecting one actor over more than one actor; and selecting an actor that is near the mouse selection over an actor that is further from the mouse selection.

2. A method for controlling a motion of actors on a display screen ill response to a user input when more than one motion is possible, comprising the steps of:

selecting an actor to be moved;

determining if the selected actor can be moved;

if it is determined that the selected actor can be moved, then moving the selected actor; and if it is determined that the selected actor cannot be moved, then returning to the selecting step;

wherein the step of selecting an actor to be moved comprises the steps of:

selecting an actor that is pinned into a groove over an unconstrained actor; and selecting an actor that is connected to a spring over an unconstrained actor; and wherein the step of selecting an actor that is connected to a spring over an unconstrained actor is followed by the step of:

selecting an unconstrained actor over an actor that is pinned into a socket; and selecting an unconstrained actor over an actor that is connected to a box.

3. The method of claim 2 wherein the step of selecting an unconstrained actor over an actor that is connected to a box is followed by the step of:

selecting one actor over more than one actor.

4. The method of claim 3 wherein the step of selecting one actor over more than one actor is followed by the step of:

selecting an actor that is near the mouse selection over an actor that is further from the mouse selection.

5. An apparatus for controlling a motion of actors on a display screen in response to a user input when more than one motion is possible, comprising:

means for selecting an actor to be moved;

means for determining if the selected actor can be moved;

means for, if it is determined that the selected actor can be moved, moving the selected actor; and means for, if it is determined that the selected actor cannot be moved, returning to the selecting step;

wherein the means for selecting an actor to be moved is one from a group consisting of:

means for selecting an actor that is pinned into a groove over an unconstrained actor;

means for selecting an actor that is connected to a spring over an unconstrained actor;

means for selecting an unconstrained actor over an actor that is pinned into a socket;

means for selecting an unconstrained actor over an actor that is connected to a box;

means for selecting an unconstrained actor over an actor that is connected to glue;

means for selecting one actor over more than one actor; and means for selecting an actor that is near the mouse selection over an actor that is further from the mouse selection.

6. An apparatus for controlling a motion of actors on a display screen in response to a user input when more than one motion is possible, comprising:

means for selecting an actor to be moved;

means for determining if the selected actor can be moved;

means for if it is determined that the selected actor can be moved, moving the selected actor; and means for, if it is determined that the selected actor cannot be moved, returning to the selecting step;

wherein the means for selecting an actor to be moved comprises:

means for selecting an actor that is pinned into a groove over an unconstrained actor;

means for selecting an actor that is connected to a spring over an unconstrained actor;

means for selecting an unconstrained actor over an actor that is pinned into a socket; and means for selecting an unconstrained actor over an actor that is connected to a box.

7. The apparatus of claim 6 wherein the means for selecting an actor to be moved comprises means for selecting one actor over more than one actor.

8. The apparatus of claim 7 wherein the means for selecting an actor to be moved comprises means for selecting an actor that is near the mouse selection over an actor that is further from the mouse selection.

* * * * *

UNITED STATES PATENT AND TRADEMARK OFFICE
CERTIFICATE OF CORRECTION

PATENT NO. : 5,600,774
DATED : February 4, 1997
INVENTOR(S) : James C. Spohrer

It is certified that error appears in the above-identified patent and that said Letters Patent is hereby corrected as shown below:

In the claims:
    Claim 2, column 12, line 36, "ill" should read -- in--.

Signed and Sealed this

Eighth Day of December, 1998

*Attest:*

BRUCE LEHMAN

*Attesting Officer*   *Commissioner of Patents and Trademarks*